US009424472B2

(12) United States Patent
So

(10) Patent No.: US 9,424,472 B2
(45) Date of Patent: Aug. 23, 2016

(54) AUGMENTED REALITY INFORMATION SYSTEM

(71) Applicant: eBay Inc., San Jose, CA (US)

(72) Inventor: Wai Kei So, Daly City, CA (US)

(73) Assignee: eBay Inc., San Jose, CA (US)

( * ) Notice: Subject to any disclaimer, the term of this patent is extended or adjusted under 35 U.S.C. 154(b) by 218 days.

(21) Appl. No.: 13/685,479

(22) Filed: Nov. 26, 2012

(65) Prior Publication Data
US 2014/0146082 A1    May 29, 2014

(51) Int. Cl.
*G09G 5/00* (2006.01)
*G06K 9/00* (2006.01)

(52) U.S. Cl.
CPC ....... *G06K 9/00671* (2013.01); *G06K 2209/27* (2013.01)

(58) Field of Classification Search
None
See application file for complete search history.

(56) References Cited

U.S. PATENT DOCUMENTS

| 8,433,370 | B2 * | 4/2013 | Jung | 455/566 |
|---|---|---|---|---|
| 8,743,145 | B1 * | 6/2014 | Price | 345/633 |
| 8,761,590 | B2 * | 6/2014 | An et al. | 396/72 |
| 2006/0167883 | A1 * | 7/2006 | Boukobza | 707/10 |
| 2007/0162942 | A1 * | 7/2007 | Hamynen et al. | 725/105 |
| 2007/0219964 | A1 * | 9/2007 | Cannon et al. | 707/3 |
| 2009/0102859 | A1 * | 4/2009 | Athsani et al. | 345/619 |
| 2009/0216446 | A1 * | 8/2009 | Ma et al. | 701/213 |
| 2010/0161215 | A1 * | 6/2010 | Karani | H04W 4/02 701/465 |
| 2011/0148922 | A1 * | 6/2011 | Son et al. | 345/633 |
| 2011/0213664 | A1 * | 9/2011 | Osterhout et al. | 705/14.58 |
| 2011/0234631 | A1 * | 9/2011 | Kim | G06T 15/60 345/632 |
| 2012/0001939 | A1 * | 1/2012 | Sandberg | 345/633 |
| 2012/0075341 | A1 * | 3/2012 | Sandberg | 345/633 |
| 2012/0203799 | A1 * | 8/2012 | Blanchflower et al. | 707/784 |
| 2012/0223966 | A1 * | 9/2012 | Lim | G06F 3/011 345/633 |
| 2012/0233025 | A1 * | 9/2012 | Calman et al. | 705/26.61 |
| 2012/0237082 | A1 * | 9/2012 | Sengupta et al. | 382/103 |
| 2012/0306920 | A1 * | 12/2012 | Bathiche et al. | 345/633 |
| 2013/0170710 | A1 * | 7/2013 | Kuoch et al. | 382/104 |
| 2013/0188886 | A1 * | 7/2013 | Petrou | G06F 3/048 382/305 |

* cited by examiner

*Primary Examiner* — William Beutel
(74) *Attorney, Agent, or Firm* — Schwegman, Lundberg & Woessner, P.A.

(57) ABSTRACT

In various example embodiments, a system and method for providing information in an augmented reality display are provided. In example embodiments, a continuous stream of image data captured by a client device is received. An object within the continuous stream of image data is identified. Based on an identification of the object from the continuous stream of image data, a search for information related to the object is performed. A result is determined by filtering the information related to the object. The result is formatted to be displayed over a real-time image of the object on the client device.

21 Claims, 7 Drawing Sheets

_US 9,424,472 B2_

AUGMENTED REALITY INFORMATION SYSTEM

FIELD

The present disclosure relates generally to providing information, and in a specific example embodiment, to providing information using augmented reality.

BACKGROUND

Typically, when a user is interested in an object, the user manually takes a picture of the object and sends the picture to a backend system for analysis. This requires the user to aim, select a capture picture button, then send the captured picture to the backend system to perform an image search for generic or static information. The results are then typically returned on a new window that is not associated with the captured image. If the search results are not correct, the user may need to capture another picture of the object and send it back to the backend system for a further search.

BRIEF DESCRIPTION OF DRAWINGS

Various ones of the appended drawings merely illustrate example embodiments of the present invention and cannot be considered as limiting its scope.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Example embodiments described herein provide systems and methods for providing information using augmented reality. The information that is provided is based on analysis of a continuous stream of image data as a user device continuously focuses on one or more objects in an environment. As such, the user does not need to focus and capture individual static images of the object(s) of interest or provide continual manual inputs. In addition to the continuous stream of image data, the user device may send other data to an augmentation system such as session information, user device identifier, location information, orientation, and time information (herein collectively referred to as "device data").

Based on the continuous stream of images and the device data, the augmentation system identifies the one or more objects, searches for related information, and aggregates and optionally filters the information based, in part, on the device data. The aggregated information is then formatted and returned to the user to be presented with a real-time display of the objects to which the aggregated information is directed. In example embodiments, the formatted results are presented in one or more windows positioned relative to the corresponding object(s). The continuous stream of data (e.g., image data and device data) allows the augmentation system to refine the identification of the object, refine the search, and refine aggregation of the information to be returned as results. Thus, for example, the formatted results may be refined, with each iteration, from generic information to specific product listings.

By using embodiments of the present invention, a user may easily and quickly obtain information regarding an object of interest. The user does not need to continually refine search criteria, manually capture further images, or input further search terms. Accordingly, one or more of the methodologies discussed herein may obviate a need for repeated processing to search for information to present to the user. This may have the technical effect of reducing computing resources used by one or more devices within the system. Examples of such computing resources include, without limitation, processor cycles, network traffic, memory usage, storage space, and power consumption.

Figure 1:
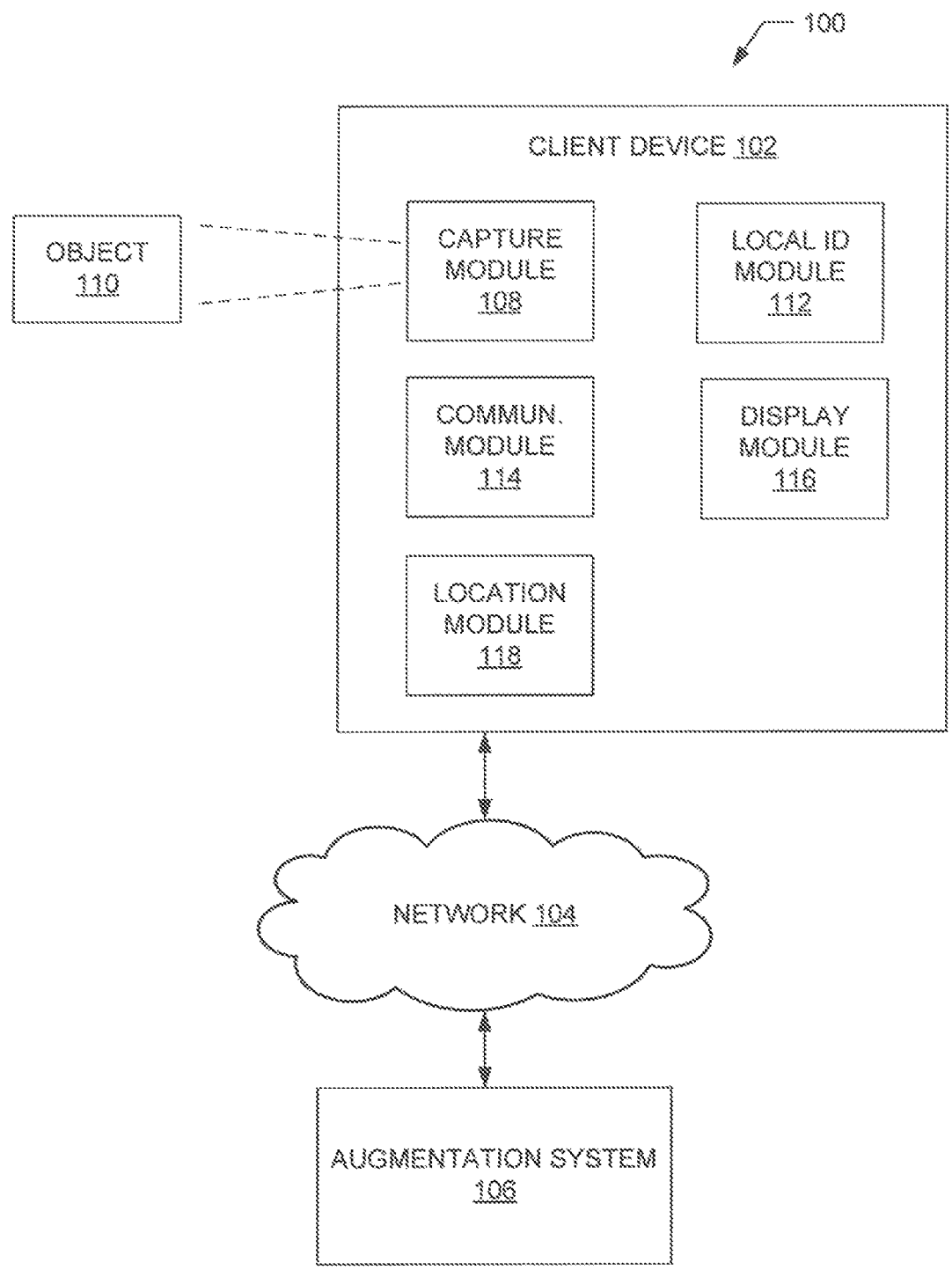
FIG. 1 is a diagram illustrating an example environment in which embodiments of a system for providing information using augmented reality may be implemented.

With reference to FIG. 1, a diagram illustrating an example environment 100 in which embodiments of a system for providing information using augmented reality based on a continuous stream of image data may be implemented is shown. The environment 100 comprises a client device 102 coupled via a network 104 (e.g., the Internet, wireless network, cellular network, or a Wide Area Network (WAN)) to an augmentation system 106.

The client device 102 may comprise a mobile phone, laptop, tablet, or any other communication device (e.g., mobile device) that a user may utilize to capture images and communicate via the network 104. In example embodiments, the client device 102 comprises a capture module 108 that is configured to capture continuous image data (e.g., video stream) of an object 110. For example, the capture module 108 may be or is a part of a video camera. While only one object 110 is shown in FIG. 1, it is noted that any number of objects 110 may be present in the environment 100, and the capture module 108 may continuously capture images of these objects 110. For example, the capture module 108 may be moved to scan a plurality of objects 110 in a room. Alternatively, the capture module 108 may be moved to scan a plurality of views (e.g., front, back, top) of one particular object 110 or to zoom in on the object 110. It is noted that the capture module 108 captures continuous image data of the object 110 and not just a still image (e.g., photograph).

The client device 102 may further comprise a local identification (ID) module 112, a communication module 114, and a display module 116. In some embodiments, the continuous stream of image data of the object 110 may be locally identified by the local ID module 112. In one embodiment, the local ID module 112 accesses a database of objects and performs a match analysis to identify the object. Other methods for identifying the object 110 by the local ID module 112 may be contemplated. Once identified, the data regarding the identified object may be provided to the augmentation system 106 by the communication module 114.

In embodiments where the local ID module 112 cannot identify the object 110 or in embodiments where the client device 102 does not include the local ID module 112, the communication module 114 forwards the continuous image data (e.g., a video feed or stream) to the augmentation system 106 for analysis and identification of the object 110. In some embodiments, the image data may be forwarded at a predetermined interval (e.g., every 5 seconds). In response to the data sent to the augmentation system 106 (e.g., object identification data or the continuous image data), information to be displayed by the display module 116 is received from the augmentation system 106 by the communication module 114.

In further embodiments, the client device 110 may comprise one or more of a touch screen, accelerometer, microphone, and a location module 118 (e.g., GPS device). In particular, the location module 118 may identify a particular location of the client device 102 when the image is being captured. The location module 118 may also identify a particular direction that the capture module 108 is pointing in and even an orientation of the capture module 108 (e.g., pointed downward or at an angle). The location, direction, and orientation data (hereinafter collectively referred to as the "location data") may also be provided to the augmentation system 106. Furthermore, other data may be captured by various components of the client device 102 and sent to the augmentation system 106, such as session information, user information, and time and date information.

The augmentation system 106 uses various data received from the client device 102 and determines information to be provided back as results to be displayed in an augmented reality display. In some embodiments, the augmentation system 106 uses the continuous image data along with the location data to identify the object 110. The augmentation system 106 may also use the session information, user information, time and date information, and any other device data obtained from the client device 102 to search for and refine information to return to the client device 102. The augmentation system 106 will be discussed in further detail in connection with FIG. 2.

It is noted that the environment 100 shown in FIG. 1 is exemplary. For example alternative embodiments may comprise any number of objects 110 and augmentation systems 106 in the environment 100. Additionally, the components of the client device 102 may be optional and the functionalities of the components combined or divided.

Figure 2:
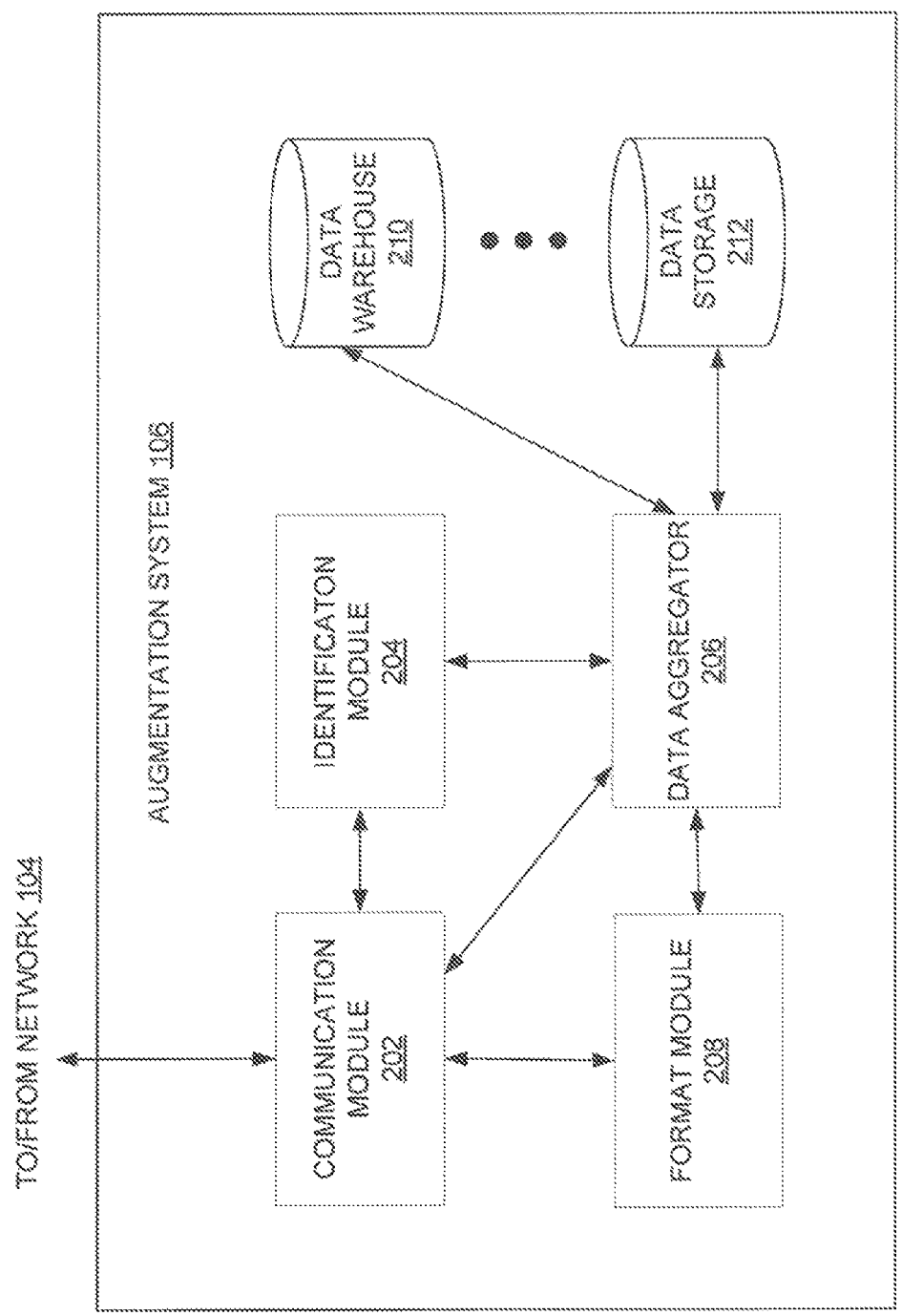
FIG. 2 is a block diagram illustrating an example embodiment of an augmentation system.

Referring now to FIG. 2, a detailed block diagram of the augmentation system 106 is shown. In example embodiments, the augmentation system 106 comprises a communication module 202, an identification module 204, a data aggregator 206, and a format module 208. In some embodiments, the communication module 202 of the augmentation system 106 receives data identifying the object 110 (e.g., the client device 102 already identified the object 110) along with the device data. This data is provided to the data aggregator 206, which uses the data to determine the results (e.g., filtered, aggregated information) to be returned to the client device 102.

In some embodiments, the communication module 202 of the augmentation system 106 receives the continuous stream of image data along with the device data. This data is provided to the identification module 204, which uses the data to identify the object 110. In some embodiments, the identification module 204 performs image recognition processing based on the received image data and the device data (e.g., orientation and direction of the capture module 108). For example, the identification module 204 may attempt to analyze the image data and match the data to known objects. The identification module 204 may refine the image recognition processing after an event (e.g., a particular period of time, change in orientation or direction of the capture module 108) that may reflect a change in the data received from the client device 102. For example, a first iteration of image recognition may identify that the object 110 is a telephone. As the capture module 108 is moved closer to the object 110, the image data may show an interface of the telephone that may indicate to the identification module 204 that the telephone is a networked IP phone. The capture module 108 may then be moved to capture a backside of the telephone which provides manufacturer information. Thus, the orientation and the direction of the capture module 108 is changed, which is reflected in the device data that is received by the communication module 202 and provided to the identification module 204. In this example, the identification module 204 may now identify the object 110 as a Cisco Unified IP Phone model 7961G.

Once identified, the identification data along with device data received from the client device 102 is forwarded to data aggregator 206. The data aggregator 206 is a backend component of the augmentation system 106 that performs searches based on the identified object and device data. In example embodiments, the data aggregator 206 searches for, aggregates, and filters data retrieved from one or more data storage units (e.g., data warehouse 210 and data storage 212). It is noted that any number of data storage units may be searched by the data aggregator 206. The data aggregator 206 also determines the aggregated data to be returned to the client device 102. The aggregated data to be returned may be based on, for example, user preferences, location, and time. The data aggregator 206 is unique in the sense that it takes whatever data is sent from identification module 112 or 204 which is not necessarily a text string containing a brand name along with device data (e.g., position, orientation, time of day, and other metadata) and determines a result using these inputs. The data aggregator 206 will be discussed in more detail in connection with FIG. 3 below.

Once the data is aggregated and the results to be returned is determined by the data aggregator 206, the format module 208 formats the results along with instructions for display in an augmented reality format at the client device 102. For example, the format module 208 may provide instructions for the results to be displayed in a window that is directed to the identified object 110. The formatted results are then returned to the client device 102 by the communication module 202

Figure 3:
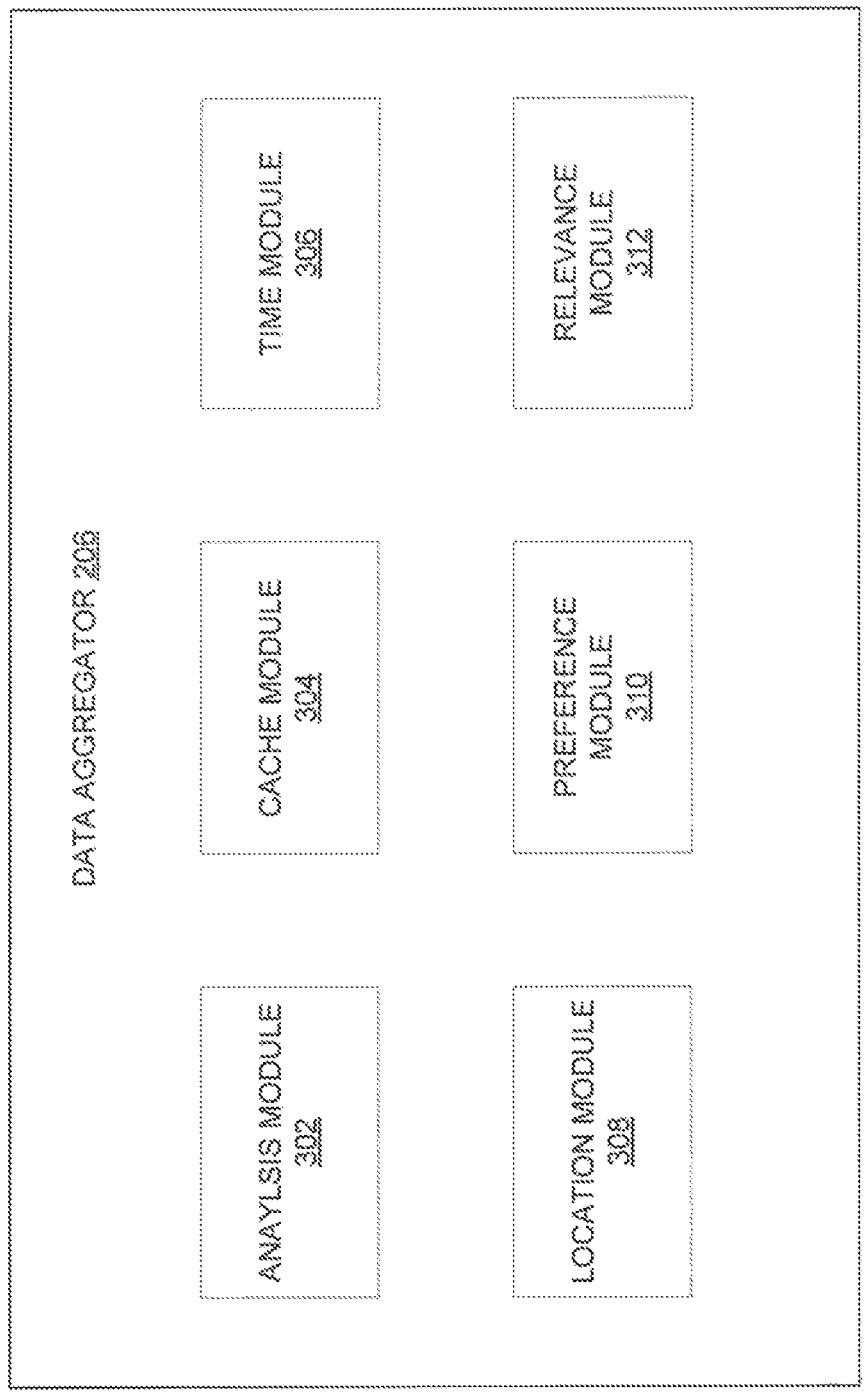
FIG. 3 is a block diagram illustrating an example embodiment of a data aggregator.

FIG. 3 is a block diagram illustrating the data aggregator 206 in more detail. The data aggregator 206 takes the identification data for the object 110 along with device data and searches for results to return to the client device 102. In example embodiments, the search is refined as the identification of the object becomes more detailed (e.g., from telephone to IP networked telephone to Cisco Unified IP Phone model 7961G). In example embodiments, the data aggregator 206 comprises an analysis module 302, a cache module 304, a time module 306, a location module 308, a preference module 310, and a relevance module 312.

The analysis module 302 performs real time queries of the data storage units (e.g., data warehouse 210 and data storage 212) to obtain information such as current price, how many items are being sold, user reviews, and so forth. In cases where the object 110 is identified as a particular, distinguishable item (e.g., Cisco Unified IP Phone model 7961G), the analysis module 302 may retrieve a product listing for the object 110. However, if the object 110 is identified more genetically (e.g., a telephone or a network IP telephone), generic information may be retrieved by the analysis module 302. In yet other embodiments where the object is identified more generically, a product listing from a category that is associated with the generically identified object is provided. With these generic results, the user may be provided a narrowing function where the user may narrow down (e.g., by navigating from the returned category to sub-categories) to obtain more specific information. It is noted that the information in the data storage units include information from the past (e.g., past transactions, history of sales, reviews of an item), information for what is currently available (e.g., product listings on a network marketplace), and information between buyers and sellers (e.g., rating for a seller, communications regarding the item between buyers and sellers).

In example embodiments, the analysis module 302 uses the device data to refine the information retrieved from the data storage units. For example, aggregated session data from a plurality of users may indicate what items are currently popular or are searched for more frequently. In sessions where users look at telephones, the users may tend to search for accessories. With this insight, the analysis module 302 can make recommendations or select particular results to be returned to the client device 102. It is noted that the recommendations may be for unrelated items (e.g., users that look at this item tend to also look at this unrelated item).

The cache module 304 caches information for items that may require more information to be returned to the client device 102. For instance, items that are not easy to sell may require more information that may be cached. In contrast, items that are easier to sell (e.g., more popular) may not need their information to be cached. Instead, the analysis module 302 may perform real time queries to the data storage units.

The cache module 304 may also perform analysis on the data storage units where listings may be tracked. For example, users may know the specifications for a popular item (e.g., an iPhone), and as a result, the specifications for the item may not need to be kept track of. If the cache module 304 determines that for iPhones, 90% of the listings contain the same keywords. Then, the cache module 304 knows other information may be more relevant. In contrast, if a search for Android phones is performed, a plurality of different brands and specifications are retrieved. As a result, the different listings for the different Android phones will contain more relevant words and information, which the cache module 304 will track and store in cache. In some embodiments, the tracking and evaluation of stored information may be performed by the relevance module 312 as discussed below.

The time module 306 manages aggregation and filtering of retrieved information based on time constraints to determine appropriate results that are based on the time the search is being performed. For example, the time module 306 may take the time data that is received from the client device 102 and determine whether the retrieved information is affected by the time of day. For instance, the time module 306 may know that people tend to buy office phones during business hours (e.g., 9 am to 5 pm). Thus if the search is being performed during business hours, the time module 306 can return appropriate information directed to office phones. However, if it is nighttime, then the time module 306 may determine that it is less likely to be an office phone in the image and return information that may not be directed to office phones. In some embodiments, the time module 306 may push local store information during business hours enabling local pickup for the item. The time module 306 may also add in local deals, which may enable a share of revenue for the augmentation system 106. In contrast, if the search is performed after business hours, the local stores may be closed. In this case, the time module 306 may, for example, provide online merchant information to enable online ordering of the item instead of local purchasing options.

The location module 308 continuously refines the search results based on the continuous image data that is used to identify the object 110 by the identification module 204. For example, assuming the object is not moving, the client device 102 may have a GPS. The client device 102 may thus capture and provide an orientation (e.g., how the client device 102 is pointing at the object) and location of the object. This may indicate that the client device 102, for example, is capturing the image from the side versus the front. This information may be used by the location module 308 and the identification module 204 to refine the identity of the object and to refine the search results. For instance, by knowing the location of the client device 102, the location module 308 may filter the information to provide local stores near the location of the client device 102 that carry the identified object. In an alternative embodiment, the location module 308 may be located within or be a part of the identification module 204.

The preference module 310 uses preferences of the user of the client device 102 to filter the aggregated information and optionally provide recommendations. For example, if the user is a tech enthusiast, then the preference module 310 may present more technical information for electronic devices but not for furniture. The preference information may be stored in or associated with a user profile of the user.

The relevance module 312 evaluates a set of identified objects to determine what information to return in the results. In embodiments where more than one object is identified from the image data, the relevance module 312 uses, for example, user preference data, location data, and tracked, stored data (e.g., analyzed by the cached module 304) to determine which one or more objects are likely to be the intended items of interest to the user. For example, user preference data may indicate areas of interest for the user and as a result, the relevance module 312 may select objects that correlated with the areas of interest (e.g., a laptop for a tech enthusiast instead of a cup next to the laptop). In another example, the relevance module 312 uses the location data (e.g., outside of a coffee shop) to determine that the item of interest may be the cup (e.g., having a name of the coffee shop on it) and not the laptop. In another example, the relevance module 312 may use the evaluated tracked data (e.g., what is best selling in a marketplace, what is everyone searching for, trends) to determine what results to return. It is noted that the relevance evaluation may be performed prior to or after the search by the analysis module 302 in different embodiments.

Figure 4:
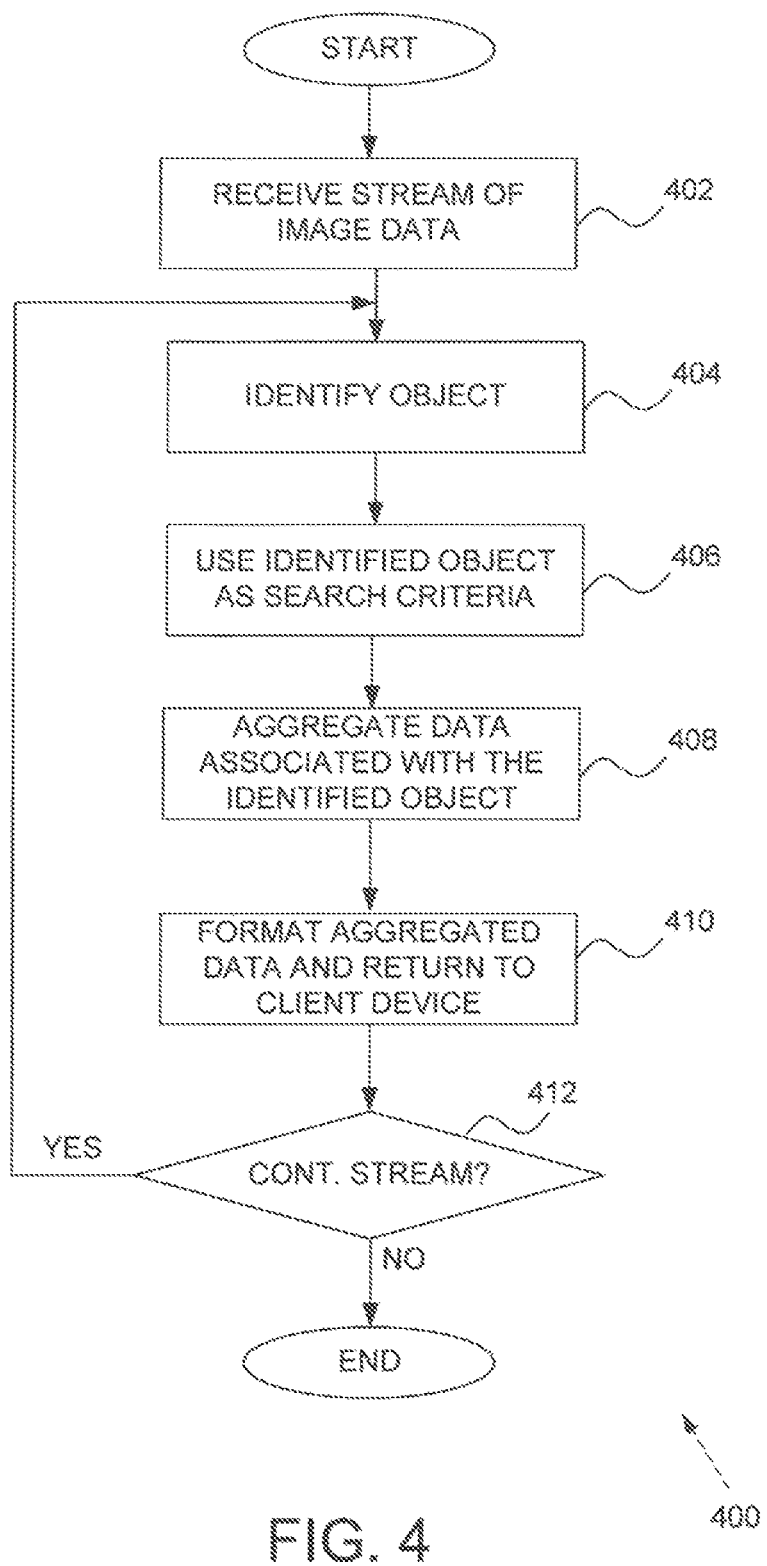
FIG. 4 is a flow diagram of an example high-level method for providing information using augmented reality.

FIG. 4 is a flow diagram of an example high-level method 400 for providing information using augmented reality. In operation 402, a stream of image data of at least one object 110 is received. In example embodiments, the capture module 108 continuously captures image data (e.g., video of the object 110) without constant user input. The stream of image data (e.g., video) may be provided to the local ID module 112 or the identification module 204 at the augmentation system 106.

In operation 404, the object is identified as a particular item. In an initial identification analysis, the item may be identified as a generic item. For example, the client device 102 starts capturing images far away from the object 110; thus the object may be identified genetically (e.g., a telephone). It is noted that more than one object may be identified from the image data and the following operations may be performed for each identified object.

In operation 406, the identified object or item is used as a search criterion by the data aggregator 206. The data aggregator 206 may access one or more data storage units (e.g., data warehouse 210 or data storage 212) and retrieve information directed to the item. In an initial analysis, the retrieved information may be generic information for the item, such as information from a category of the item (e.g., telephone). Alternatively, the retrieved information may be sample product listings for items for sale, information related to items for sale (e.g., seller ratings related to the item, communications regarding the item), or non-sale information (e.g., product reviews).

The information is aggregated in operation 408. The aggregation of the information may include filtering the information retrieved from the data storage units to determine the results (e.g., selected aggregated data) to the client device 102. The operations involved in aggregating the information will be discussed in more detail in connection with FIG. 5.

In operation 410, the results are formatted to be returned to the client device 102. In example embodiments, the format module 208 formats the results along with providing instructions for displaying the results in an augmented reality format at the client device 102. For example, the format module 208 may provide instructions for the results to be displayed in a window that is graphically directed towards the identified object 110. If results are provided for more than one object, the format module 208 will provide instructions for displaying the results graphically directed to the respective object. The formatted results are then returned to the client device 102 by the communication module 202.

In operation 412, a determination is made as to whether the continuous stream of image data is still being received. If the continuous stream is being received, that the method 400 returns to operation 404 whereby the identification of the object is refined. For example, as the client device 102 gets closer to the object 110, a brand name or other features of the object 110 that may help to better define the object is captured in the image data. The identification module 204 can take the additional data and refine the identification of the object (e.g., networked IP telephone or Cisco Unified IP Phone model 7961G) in operation 404. Subsequently, the analysis module 302 may search for more specific information in operation 406. As such, the augmentation system 106 may perform a set of image searches that help to better identify and narrow down on results to be returned to the client device 102. In essence, the augmentation system 106 can perform a three-dimensional model search by continuously refining the identification. For example, initially the augmentation system 106 can present the user with one listing. If a threshold is reached that identifies the object 110 as a more specific item, the augmentation system 106 can continuously update the information and provide more information or provide updated information. In some embodiments, the user may scroll down on the display or use dropdown menus on the client device 102 to access the additional information. Alternatively, the information may refresh after a particular amount of time (e.g., after 5 to 10 seconds) with new information or additional windows may be provided.

Figure 5:
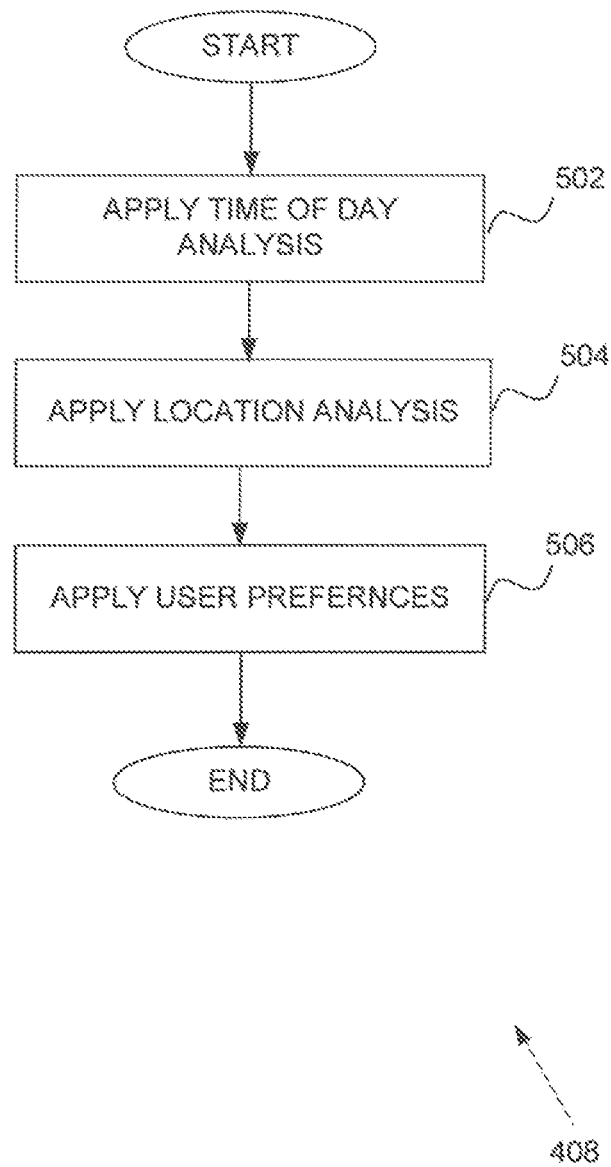
FIG. 5 is a flow diagram of an example high-level method for aggregating data.

FIG. 5 is a flow diagram of an example high-level method (e.g., operation 408) for aggregating and filtering data. The method includes retrieving information from various data storage units and filtering the information based on device data and user preferences. In various embodiments, the retrieved data may include feedback for sellers, information regarding how positive buyers are of a particular item, an average price, product listings, category listings, and so forth.

In operation 502, a time of day analysis is performed by the time module 306 to determine appropriate results based on the time the search is being performed. For example, the time module 306 may take the time data that is received from the client device 102 and determine whether the retrieved information is affected by the time of day. For instance, business items tend to be bought during business hours (e.g., 9 am to 5 pm). Thus if the search is being performed during business hours, the time module 306 can return information directed to a business item. However, if it is nighttime, then the time module 306 may determine that it is less likely to be a business item in the image and return information that may not be directed to a business item. In other examples, the results may include local store information during business hours to enable the user to locally purchase the item, while online information may be returned during non-business hours.

In operation 504, a location analysis is performed by the location module 308 to refine the search results based on location data. For example, the client device 102 may capture and provide a location of the object 110. This information may be used by the location module 308 to refine the search results. For instance, by knowing the location of the client device 102, the location module 308 may filter the information to provide local stores near the location of the client device 102 that carry the identified object.

In operation 506, a preference analysis may be performed by the preference module 310 to refine the information in the results. The preferences may be based on a user profile of the user of the client device 102 along with preference information from associated users (e.g., friends, other users with similar attributes). The preference information may be used to filter the aggregated information and to provide recommendations to the user. For example, if the user is a tech enthusiast, then the preference module 310 may present more technical information for electronic devices but not for furniture.

It is noted that the operations of FIG. 5 may be performed in any order and may be optional. For example, some of the operations may be performed while others are not. The results of the operations of FIG. 5 are the filtered, aggregated results that will be formatted and returned to the user at the client device 102. The level of detail of the results that are returned is based, in part, on the level of identification of the object 110. As more iterations of the identification processing are performed and the identification of the object 110 becomes more detailed, the results may include more specific information for the object. Thus, initial results may include more averaged or generic information, while refined results will be more specific.

Figure 6:
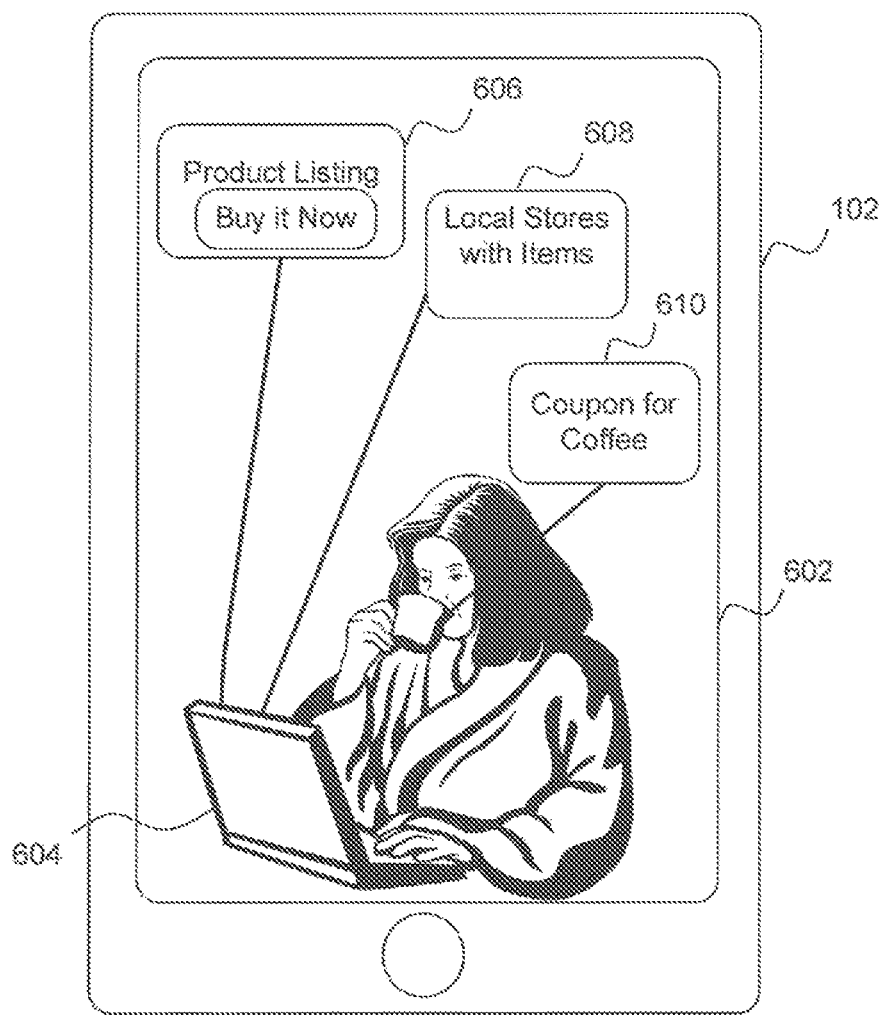
FIG. 6 is an example display of information using augmented reality.

Referring to FIG. 6 an example display of information using augmented reality is shown. In this example, the client device 102 is capturing an image of a woman using a laptop and drinking coffee, as shown on a display 602 of the client device 102. The captured image is sent to the augmentation system 106 and results are returned that are formatted to be displayed over the real-time image on the display 602. In the present example, two windows of information are presented that are directed to (e.g., connected by a line to) an identified object 604 (e.g., the laptop). A first window 606 indicates a product listing with a Buy-It-Now button that allows the user to purchase the identified object. A second window 608 provides information about local stores that may sell the identified object. A third window 610 is directed to a second identified object (e.g., a cup of coffee) and provides a coupon for coffee. In alternative embodiments, other forms of information display may be utilized. For example, the windows may be scrollable or may comprise dropdown menus to allow access to additional information, or the information may be provided on a side of the display 602. Additionally, any number of windows may be presented in the display 602. While the results presented in the display 602 are related to commerce, alternative embodiments may contemplate providing information that is non-commerce directed (e.g., reviews of coffee or laptops, location of nearest coffee shops, blogs, comments, or communications regarding laptops).

While particular information is shown in the windows 606 and 608 of FIG. 6, any type of information related to the identified object 604 may be provided. For example, the windows 606 and 608 may display feedback, item locations, number of stores that sell the item locally, seller ratings, item ratings, product specifications, recommendations, and so forth.

Figure 7:
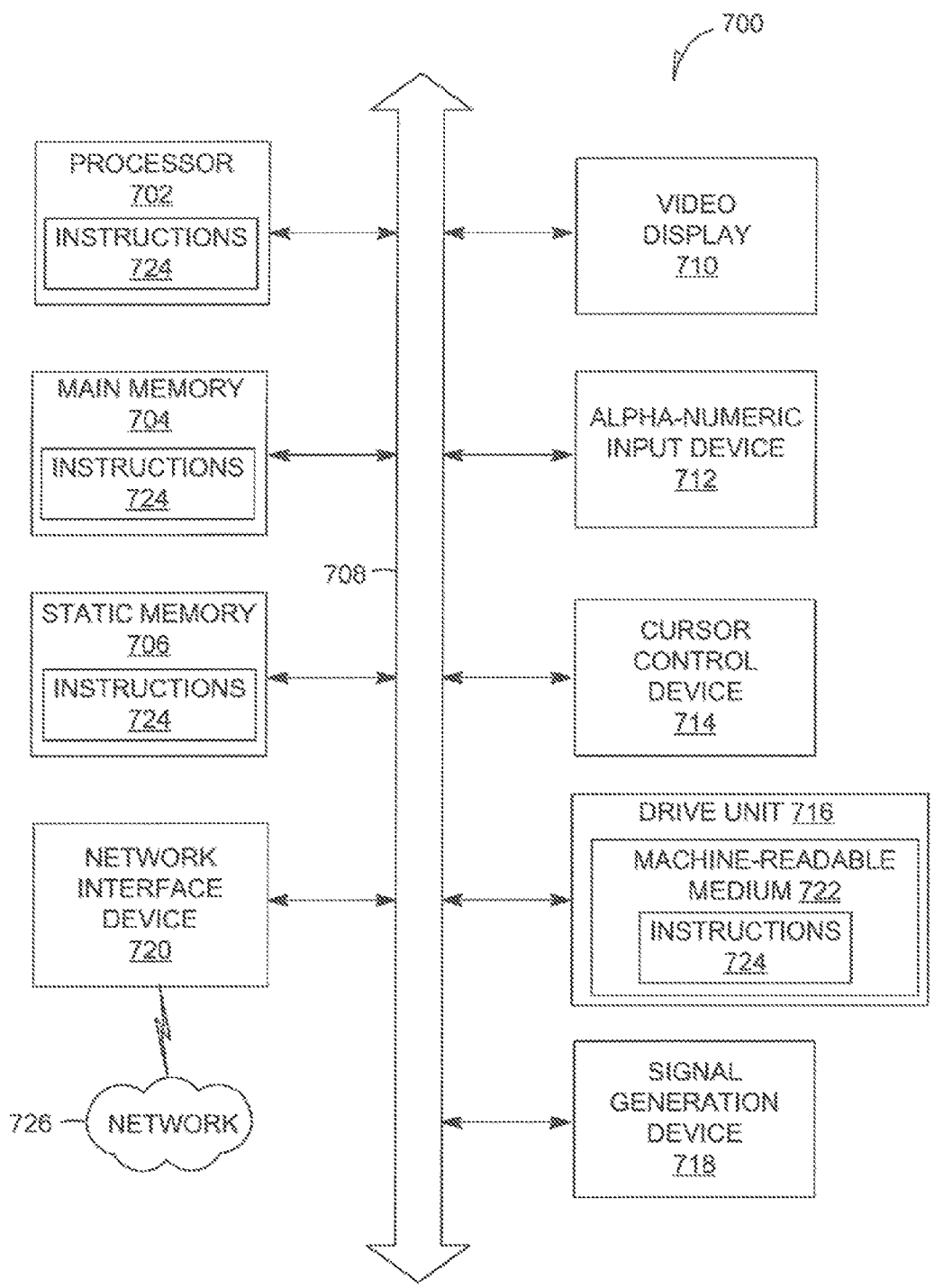
FIG. 7 is a simplified block diagram of a machine in an example form of a computing system within which a set of instructions for causing the machine to perform any one or more of the methodologies discussed herein may be executed.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system and within which instructions 724 (e.g., software, a program, an application, an applet, an app, or other executable code) for causing the machine 700 to perform any one or more of the methodologies discussed herein may be executed. In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724, sequentially or otherwise, that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The machine 700 may further include a graphics display 710 (e.g., a plasma display panel (PDP), a light emitting diode (LED) display, a liquid crystal display (LCD), a projector, or a cathode ray tube (CRT)). The machine 700 may also include an alpha-numeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a speaker), and a network interface device 720.

The storage unit 716 includes a machine-readable medium 722 on which is stored the instructions 724 embodying any one or more of the methodologies or functions described herein. The instructions 724 may also reside, completely or at least partially, within the main memory 704, within the processor 702 (e.g., within the processor's cache memory), or both, during execution thereof by the machine 700. Accordingly, the main memory 704 and the processor 702 may be considered as machine-readable media. The instructions 724 may be transmitted or received over a network 726 via the network interface device 720.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 700), such that the instructions, when executed by one or more processors of the machine (e.g., processor 702), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

The instructions 724 may further be transmitted or received over a communications network 726 using a transmission medium via the network interface device 720 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a held programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements all within a scope of embodiments of the present invention as represented by the appended claims. The specification and drawings are, accordingly, to be regarded in an illustrative rather than a restrictive sense.

What is claimed is:

1. A method comprising:
    initially receiving a continuous stream of image data captured by a client device;
    deriving an initial identification of an object within the continuous stream of image data, the initial identification of the object derived from the continuous stream of image data comprising a category of the object;
    based on the initial identification of the object derived from the continuous stream of image data, searching for information related to the category of the object;
    determining, by a processor of a machine, a result to return to the client device by filtering the information related to the category of the object, the result comprising generic information corresponding to the category of the object;
    formatting the result to be displayed with a real-time image display of the object on the client device;
    further receiving the continuous stream of image data after an event, the continuous stream of image data after the event comprising additional image data regarding the object, the additional image data providing more visual details and features of the object than the image data initially received;
    using the additional visual data, automatically refining the identification of the object, the refined identification indicating a specific type within the category of the object;
    automatically, without human intervention, performing a further search for more information in response to the automatically refined identification of the object, the more information comprising information more specific than the generic information and pertaining to the specific type within the category; and
    refining the result returned to the client device based on the further search, the refined result comprising the more specific information.

2. The method of claim 1, further comprising:
    receiving location data captured by the client device, the location data including an orientation of the client device relative to the object and direction of the client device; and
    refining the identification of the object using the location data.

3. The method of claim 1, further comprising:
    receiving time data from the client device, the time data indicating a time that the continuous stream of image data is captured,
    wherein the result comprises local store information based on the time that the image data is captured being during business hours and online merchant information based on the time that the image data is captured being after business hours.

4. The method of claim 1, further comprising receiving location data from the client device, wherein the filtering of the information comprises providing local store information near a location of the client device that carries the object.

5. The method of claim 1, wherein determining the result comprises:
    accessing a user profile of a user of the client device; and
    using attributes of the user profile to filter the information.

6. The method of claim 5, wherein the determining comprises providing more or fewer details for the object based on the attributes of the user profile.

7. The method of claim 1, wherein
    the refined result comprising the more specific information comprises a product listing for the specific type within the category.

8. The method of claim 1, further comprising:
    tracking session data associated with the object from a plurality of users; and
    determining whether to cache information for the object based on the tracked session data, information being cached for objects that require more information due to being less popular.

9. The method of claim 1, wherein a plurality of objects are identified within the continuous stream of image data, the method further comprising:
    evaluating relevance of each of the plurality of objects using at least one of user preference data, location data, or tracked data; and
    determining for which one or more of the plurality of objects to return the result based on the relevance.

10. A machine-readable storage medium having no transitory signals and storing instructions which, when executed by the at least one processor of a machine, cause the machine to perform operations comprising:
    initially receiving a continuous stream of image data captured by a client device;
    deriving an initial identification of an object within the continuous stream of image data, the initial identification of the object derived from the continuous stream of image data comprising a category of the object;
    based on the initial identification of the object derived from the continuous stream of image data, searching for information related to the category of the object;
    determining a result to return to the client device by filtering the information related to the category of the object, the result comprising generic information corresponding to the category of the object;
    formatting the result to be displayed with a real-time image display of the object on the client device;
    further receiving the continuous stream of image data after an event, the continuous stream of image data after the event comprising additional image data regarding the object, the additional image data providing more visual details and features of the object than the image data initially received;
    using the additional visual data, automatically refining the identification of the object, the refined identification indicating a specific type within the category of the object;
    automatically, without human intervention, performing a further search for more information in response to the automatically refined identification of the object, the more information comprising information more specific than the generic information and pertaining to the specific type within the category; and refining the result returned to the client device based on the further search, the refined result comprising the more specific information.

11. The machine-readable storage medium of claim 10, wherein the operations further comprise:

receiving location data captured by the client device, the location data including an orientation of the client device relative to the object and direction of the client device; and refining the identification of the object using the location data.

12. The machine-readable storage medium of claim 10, wherein the operations further comprise:

receiving time data from the client device, the time data indicating a time that the continuous stream of image data is captured, wherein the result comprises local store information based on the time that the image data is captured being during business hours and online merchant information based on the time that the image data is captured being after business hours.

13. The machine-readable storage medium of claim 10, wherein the operations further comprise receiving location data from the client device, wherein the filtering of the information comprises providing local store information near a location of the client device that carries the object.

14. The machine-readable storage medium of claim 10, wherein the refined result comprising the more specific information comprises a product listing for the specific type of the object in the category.

15. A system comprising:

one or more processors configured to perform operations comprising:

initially receiving a continuous stream of image data captured by a client device;

deriving an initial identification of an object within the continuous stream of image data, the initial identification of the object derived from the continuous stream of image data comprising a category of the object;

based on the initial identification of the object derived from the continuous stream of image data, searching for information related to the category of the object;

determining a result to return to the client device by filtering the information related to the category of the object, the result comprising generic information corresponding to the category of the object;

formatting the result to be displayed with a real-time image display of the object on the client device;

receiving the continuous stream of image data after an event, the continuous stream of image data after the event comprising additional image data regarding the object, the additional image data providing more visual details and features of the object than the image data initially received;

using the additional visual data, automatically refining the identification of the object, the refined identification indicating a specific type within the category of the object;

automatically, without human intervention, performing a further search for more information in response to the automatically refined identification of the object, the more information comprising information more specific than the generic information and pertaining to the specific type within the category; and refining the result returned to the client device based on the further search, the refined result comprising the more specific information.

16. The system of claim 15, wherein the operations further comprise receiving location data captured by the client device, the location data including an orientation of the client device relative to the object and direction of the client device and to refine the identification of the object using the location data.

17. The system of claim 15, wherein the operations further comprise filtering information based on a time that the image data is captured.

18. The system of claim 15, wherein the operations further comprise filtering the information based on a location of the client device.

19. The system of claim 15, wherein the operations further comprise accessing a user profile of a user of the client device and use attributes of the user profile to filter the information.

20. The system of claim 15, wherein the operations further comprise:

tracking session data associated with the object from a plurality of users; and determining whether to cache information for the object based on the tracked session data.

21. The system of claim 15, wherein the operations further comprise evaluating relevance of a plurality of objects that are identified within the continuous stream of image data using at least one of user preference data, location data, or tracked data, and determine for which one or more of the plurality of objects to return the result based on the relevance.

* * * * *